US007154858B1

(12) United States Patent
Zhang et al.

(10) Patent No.: US 7,154,858 B1
(45) Date of Patent: Dec. 26, 2006

(54) SYSTEM AND METHOD FOR MEASURING LATENCY OF A SELECTED PATH OF A COMPUTER NETWORK

(75) Inventors: Kui Zhang, Cupertino, CA (US); Satyanarayana R. Raparla, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/345,193

(22) Filed: Jun. 30, 1999

(51) Int. Cl.
  *H04J 1/16* (2006.01)
  *H04L 1/00* (2006.01)
  *H04L 12/26* (2006.01)
(52) U.S. Cl. .................. 370/252; 370/230; 370/235; 370/236
(58) Field of Classification Search ............... 370/252, 370/406, 236, 253, 230.1, 230, 235, 235.1, 370/400, 410; 709/241
  See application file for complete search history.

(56) References Cited

U.S. PATENT DOCUMENTS

| 5,477,531 | A |   | 12/1995 | McKee et al. ............... 370/17 |
| 5,606,669 | A |   | 2/1997  | Bertin et al. ........... 395/200.15 |
| 5,781,534 | A |   | 7/1998  | Perlman et al. ............. 370/248 |
| 5,892,754 | A | * | 4/1999  | Kompella et al. ........... 370/236 |
| 5,902,697 | A | * | 5/1999  | Guindy et al. ............... 429/153 |
| 5,903,735 | A | * | 5/1999  | Kidder et al. ............ 395/200.7 |
| 5,920,697 | A | * | 7/1999  | Masters et al. ............. 709/219 |
| 6,023,733 | A | * | 2/2000  | Periasamy et al. .......... 709/241 |
| 6,031,841 | A | * | 2/2000  | Woundy ...................... 370/410 |
| 6,185,219 | B1| * | 2/2001  | Christie ...................... 370/410 |
| 6,286,052 | B1| * | 9/2001  | McCloghrie et al. ........ 370/235 |
| 6,393,016 | B1|   | 5/2002  | Wegner et al. |
| 6,601,098 | B1|   | 7/2003  | Case et al. |
| 6,724,727 | B1|   | 4/2004  | Counterman |
| 6,738,349 | B1|   | 5/2004  | Cen |

(Continued)

FOREIGN PATENT DOCUMENTS

EP          1335525 A2       8/2003

OTHER PUBLICATIONS

C. Metz, *RSVP: General-Purpose Signaling for IP*, IEEE Internet Computing, May-Jun. 1999.

(Continued)

*Primary Examiner*—Ajit Patel
*Assistant Examiner*—Raj Jain
(74) *Attorney, Agent, or Firm*—Cesari and McKenna, LLP

(57) ABSTRACT

The invention is directed to a system and method for accurately determining the latency of a selected path within a computer network. First, a setup or signaling protocol is used to establish a bi-directional path state that is associated with a given traffic flow having predefined parameters at each intermediary node along the selected path. Once the path states are established, a source entity disposed at a first end of the selected path formulates and transmits a test message carrying a time record or time stamp to a receiver disposed at the opposite end of the selected path. The test message is configured in accordance with the predefined traffic flow parameters, but does not include any options. By virtue of the previously established path states at each node, the message is forwarded along the selected path without incurring any route or option processing delays. Upon receipt of the test message at the receiver, it is returned back to the source, and again follows the selected path. By comparing the time at which the test message is returned with the time record contained within the message, an accurate determination of the latency of the selected path may be determined.

20 Claims, 7 Drawing Sheets

U.S. PATENT DOCUMENTS

| | | |
|---|---|---|
| 6,810,426 B1 | 10/2004 | Mysore et al. |
| 2002/0049854 A1 | 4/2002 | Cox et al. |
| 2002/0124080 A1 | 9/2002 | Leighton et al. |
| 2002/0178282 A1 | 11/2002 | Mysore et al. |

OTHER PUBLICATIONS

S. Deering, *ICMP Router Discovery Messages*, Request for Comments (RFC) 1256, Sep. 1991.

*RFC 791—IP Header Option: Strict Source and Record Route*, Connected: An Internet Encyclopedia, May 28, 1999.

*RFC 791—IP Header Option: Record Route*, Connected: An Internet Encyclopedia, May 28, 1999.

*RFC 791—IP Header Option: Loose Source and Record Route*, Connected: An Internet Encyclopedia, May 28, 1999.

*RSVP for the Multimedia Party*, Cisco Systems, Inc., Feb. 24, 1998.

D. Katz, *IP Router Alert Option*, Request for Comments (RFC) 2113, Feb. 1997.

*Switching Paths Overview*, Cisco Systems, Inc., Oct. 26, 1998.

R. Perlman, *Interconnections: Bridges and Routers*, Copyright 1992 by Addison-Wesley Publishing Company, Inc., pp. 178-184.

D. Awduche et al., *Extensions to RSVP for Traffic Engineering*, Internet Engineering Task Force (IETF), MPLS & RSVP Working Groups, Internet Draft, Aug. 1998.

T. Li et al., *A Provider Architecture for Differentiated Services and Traffic Engineering (PASTE)*, Internet Engineering Task Force (IETF), Network Working Group, Request for Comments (RFC) 2430, Oct. 1998.

\* cited by examiner

SYSTEM AND METHOD FOR MEASURING LATENCY OF A SELECTED PATH OF A COMPUTER NETWORK

FIELD OF THE INVENTION

This invention relates generally to computer networks and, more specifically, to a system for accurately measuring the latency of selected paths through a computer network.

BACKGROUND OF THE INVENTION

Organizations, including businesses, governments and educational institutions, increasingly rely on computer networks to share and exchange information. A computer network typically comprises a plurality of interconnected entities. An entity may consist of any device, such as a host or server, that sources (i.e., transmits) and/or receives messages. A common type of computer network is a local area network ("LAN") which typically refers to a privately owned network within a single building or campus. In many instances, several LANs may be interconnected by point-to-point links, microwave transceivers, satellite hook-ups, etc. to form a wide area network ("WAN") or intranet that may span an entire city, country or continent. An organization employing multiple intranets, moreover, may interconnect them through the Internet. Remote users may also utilize the Internet to contact and exchange information with the organization's intranet.

One or more intermediate network devices are often used to couple LANs together and allow the corresponding entities to exchange information. For example, a bridge may be used to provide a "bridging" function between two or more LANs or a switch may be utilized to provide a "switching" function for transferring information between a plurality of LANS. A router is often used to interconnect LANs executing different LAN standards, to interconnect two or more intranets and/or to provide connectivity to the Internet. Routers typically provide higher level functionality than bridges or switches.

In order to reduce design complexity, most computer networks are organized as a series of "layers". Each layer implements particular rules and conventions referred to as a protocol. The set of layers, moreover, are arranged to form a protocol stack. One of the most widely implemented protocol stacks is the Transmission Control Protocol/Internet Protocol (TCP/IP) Reference Model. The TCP/IP Reference Model defines five layers, which are termed, in ascending order: physical, data link, network, transport and application. The TCP/IP Reference Model basically provides a packet switched or connection-less communication service. That is, each message from a source to a destination carries the full address of the destination, and each one is routed through the network independent of the others. As a result, two messages from the same source to the same destination may follow different routes or paths through the network, depending on the level of congestion and other factors present at the time the two messages are sent.

To interconnect dispersed computer networks, many organizations rely on the infrastructure and facilities of service providers. For example, an organization may lease a number of T1 lines to interconnect various LANs. These organizations typically enter into service level agreements (SLAs) with the service providers, which include one or more traffic specifiers. The traffic specifiers may place limits on the amount of resources that the subscribing organization will consume for a given charge. For example, a user may agree not to send traffic that exceeds a certain bandwidth (e.g., 1 Mb/s). Traffic specifiers may also state the performance characteristics that are to be guaranteed by the service provider. For example, certain applications, such as video-conferencing and audio or voice applications, are highly susceptible to latency in the network. For example, voice over IP applications typically require less than 150 milliseconds of one-way delay time.

As a result, service providers and network managers are interested in determining the latency of their networks. One method to measure latency is to simply time stamp a message, send it across the network and determine how long it takes to reach its destination. However, as described above, two messages sent from the same source to the same destination may follow entirely different paths across a network. Accordingly, this approach may yield different results each time it is performed, since each message may follow a different path. Thus, to be meaningful, latency should refer to a specific path through the network.

The Internet Protocol (IP) provides a mechanism, known as source routing, for ensuring that a message follows a specific, predetermined network path. With source routing, each message carries the list of intermediate devices that the message must visit as it travels from the source to the destination. By specifying a particular set of devices, a message can be constrained to follow a select path. Source routing is implemented by adding a particular option to each message.

FIG. 1A is a block diagram of a conventional network layer message 100 that complies with version 4 of the IP protocol. Message 100 includes an IP header 102 and a data portion 104. The IP header 102 consists of a plurality of fields, including a version field 106, an IP header length field 108, a type_of_service (ToS) field 110, a total message length field 112, an identification field 114, a flags field 116 and a fragment offset field 118. Additional header fields include a time to live (TTL) field 120, a protocol field 122, which specifies the transport layer protocol to which message 100 should be passed, and a checksum field 124. The IP header 102 of each message 100 further includes an IP source address (IP SA) field 126 that identifies the source of the message 100 and an IP destination address (IP DA) field 128 that specifies the intended recipient of the message 100.

If desired, one or more options may be added to the IP header 102 following the IP DA field 128 in an options area 130. For example, options area 130 may include a source routing option 132. The IP protocol actually specifies two options that relate to source routing: strict source routing and loose source routing. In strict source routing, the entire list of layer 3 devices, such as routers and layer 3 switches, through which message 100 must pass as it travels from the source to the destination is specified. In loose source routing, only those layer 3 devices that message 100 must not miss as it travels from the source to the destination are identified. Source routing option 132 similarly includes a plurality of fields, such as a type field 134 (which is set to "131" for loose and "137" for strict routing), a length field 136 that specifies the length of option 132, a pointer field 138 and a route data field 140 that contains the list of layer 3 devices to be visited. Within data field 140, the layer 3 devices are identified by their IP addresses. The value of pointer field 138, moreover, identifies the particular address within route data field 140 to which message 100 is to be forwarded. Thus, before transmitting message 100, a layer 3 device advances the pointer of field 138 to identify the next address in the list.

IP message 100 may be encapsulated in a transport layer message. FIG. 1B is a partial block diagram of a transport layer message 150. The transport layer message 150 preferably includes a source port field 152, a destination port field 154 and a data field 156, among others. Fields 152 and 154 are preferably loaded with the predefined or dynamically agreed-upon port numbers for the particular transport layer protocol (e.g. TCP, the User Datagram Protocol (UDP), etc.) that is being utilized by the respective entities.

To measure the latency of a specific network path, a host could use the IP source routing option described above. In particular, the host could generate an IP message containing a source routing option (preferably strict) that specifies all of the layer 3 devices along the path of the interest. The host would then time stamp and transmit the message. Since the message is constrained to follow the specified path, by virtue of the source routing option, the time it takes for the message to go from the host to the destination is the latency of that path. Unfortunately, there is a substantial drawback of this approach.

Modern layer 3 devices typically include both a routing processor and a switching processor. The routing processor is utilized to perform high level route processing functions on received messages, such as identifying the best path for use in forwarding the messages, and other functions. The routing processor typically stores the received messages in a temporary buffer or register while these functions are being performed. The switching processor, on the other hand, simply moves the received messages from an input router interface to an output router interface based on "shortcuts" derived from earlier decisions rendered by the routing processor. Because the switching processor moves traffic with simpler determinations than those performed by the routing processor, latency within the router or layer 3 device can be significantly reduced by moving traffic with just the switching processor.

To the extent network layer messages include one or more options, the messages must be evaluated by the routing processor since switching processors are generally not configured to process options. By examining the value of header length field 108, a switching processor can quickly determine whether or not a given message includes any options. If the length of an IP header 102, as reflected in header length field 108, is greater than 5 octets, the switching processor "knows" that it contains at least one option. In response, the switching processor passes the message to the routing processor for further processing. At the routing processor, the message is placed in a temporary buffer or register while the routing processor determines which options are included in the message and performs the specified functions. As a result, messages containing options typically suffer a higher latency than messages that carry no options.

This added latency for messages carrying source routing options renders the corresponding latency determinations inaccurate. That is, the latency experienced by a message having a source routing option is often greater than a message carrying no options, since the source routing option must be evaluated by the routing processor of each layer 3 device at which the message is received. Since most messages, including those generated by video and audio applications, do not include options, basing latency determinations on messages carrying source routing options leads to inaccurate results. Accordingly, a need exists for a mechanism to measure the latency of selected network path with greater accuracy.

It is an object of the present invention to provide a system and method for accurately measuring the latency of a selected path in a computer network.

SUMMARY OF THE INVENTION

Briefly, the present invention is directed to a system and method for accurately determining the latency of a selected path in a computer network. According to the invention, a setup or signaling protocol is modified in a novel manner so as to establish a path reservation state at each intermediary node along the selected path. The path reservation state, moreover, is associated with a given traffic flow having predefined parameters. As part of the path reservation state, each intermediary node also creates a short-cut at its switching processor for forwarding messages matching the given traffic flow to the next node along the selected path. Once the path setup process is complete, a first entity or source time stamps and transmits a test message to a second entity or receiver. The test message is configured in accordance with the predefined traffic flow parameters, but does not include a source routing or any other option. Due to the previously established path reservation state at each node, the message is identified as matching the given traffic flow, and in response, is forwarded along the selected path by the intermediary nodes without incurring any route processing delays. Upon receipt of the test message at the receiver, it is preferably returned to the source in a similar manner. By comparing the time at which the test message is returned with the time stamp contained in the message, an accurate latency of the selected path can be determined. In the preferred embodiment, the setup or signaling protocol utilized by the present invention is the Resource reSerVation Protocol (RSVP).

BRIEF DESCRIPTION OF THE DRAWINGS

The invention description below refers to the accompanying drawings, of which.

DETAILED DESCRIPTION OF AN ILLUSTRATIVE EMBODIMENT

Figure 2:
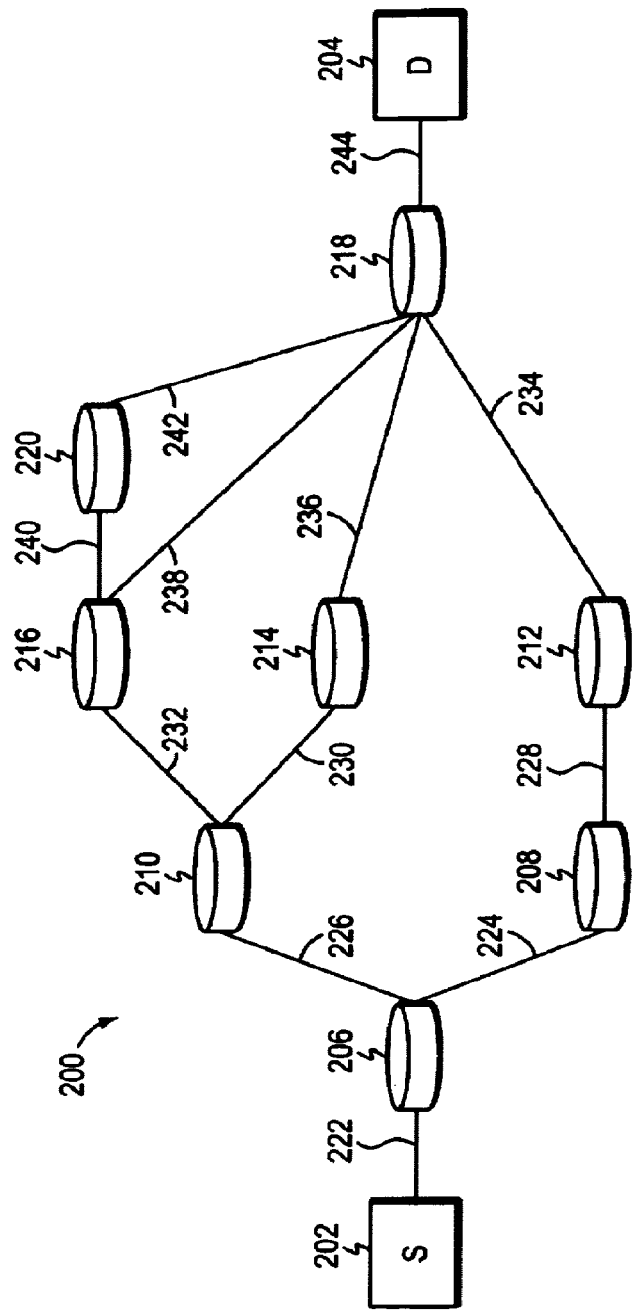
FIG. 2 is a highly schematic block diagram of a computer network.

FIG. 2 is a block diagram of a computer network 200. Network 200 includes a source entity 202 and a destination entity 204 interconnected by a plurality of layer 3 devices 206–220. In particular, source entity 202 is connected to layer 3 device 206 by link 222, and device 206, in turn, is connected to layer 3 devices 208 and 210 by links 224 and 226, respectively. Device 208 is connected to layer 3 device 212 by link 228, and device 210 is connected to layer 3 devices 214 and 216 by links 230 and 232, respectively. Devices 212–216 are each connected to layer 3 device 218 by links 234, 236 and 238, respectively. Device 216 is also connected to layer 3 device 220 by link 240, and device 220 is connected to layer 3 device 218 by link 242. Layer 3 device 218 is connected to destination entity 204 by link 244.

As shown, network 200 defines a plurality of paths or routes between source entity 202 and destination entity 204. For example, a first path follows devices 206, 208, 212 and 218. A second path follows devices 206, 210, 214 and 218. A third path follows devices 206, 210, 216, 220 and 218. Messages transmitted from source entity 202 to destination entity 204 may follow any of these paths, among others. In particular, upon receipt of a message from source entity 202, device 206 will typically calculate the path to destination entity 202 that has the fewest number of "hops". Each layer 3 device basically represents a single hop. The fewest number of hops from device 206 to destination entity 204 is 3, and there are three different paths whose hop count is 3 (i.e., (1) devices 208, 212 and 218; (2) devices 210, 214 and 218, and (3) devices 210, 216 and 218). Accordingly, device 206 may select any one of these paths for forwarding messages from source entity 202 to destination entity 204.

Layer 3 devices, including device 206, typically do not take into consideration the various processing, memory and traffic management resources at individual routers when making path determinations. Thus, although two paths may have the same hop count, messages may experience reduced latency along one path because of greater processing, memory and/or traffic management resources within the nodes of that path and/or faster transmitting capabilities of the respective links. A service provider or network administrator may be interested in determining the latency experienced by messages following different paths having the same hop count.

It should be understood that the configuration of network 200 is for illustrative purposes only, and that the present invention will operate with other, possibly far more complex, network designs or topologies.

Figure 3A:
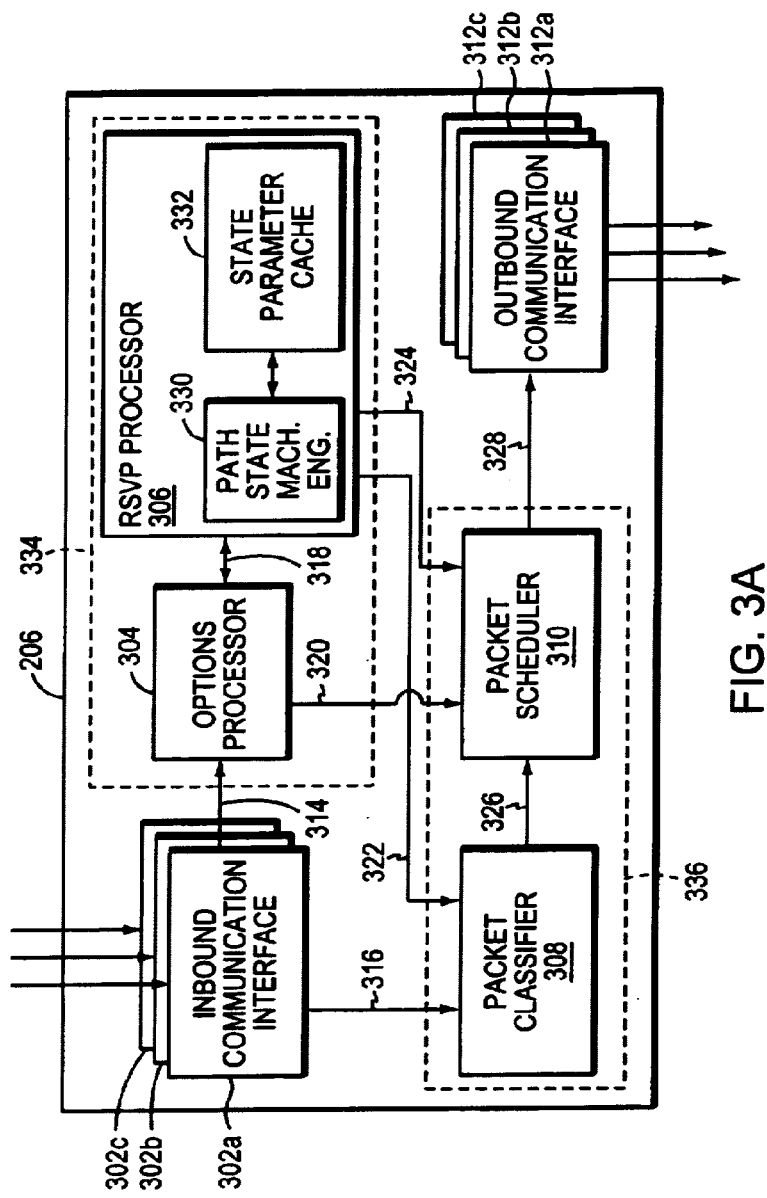
FIGS. 3A and 3B are highly schematic, partial functional diagrams of a network node and a network entity in accordance with the present invention.

FIG. 3A is a partial functional block diagram of layer 3 device 206 configured in accordance with the present invention. Device 206 includes a plurality of components, including a plurality of inbound communication interfaces 302*a–c*, an options processor 304, a Resource reSerVation Protocol (RSVP) processor 306, a packet classifier 308, a packet scheduler 310, and a plurality of outbound communication interfaces 312*a–c*. The inbound communication interfaces 302*a–c*, moreover, are in communicating relationship with both the options processor 304 and the packet classifier 308, as indicated by arrows 314 and 316, respectively. The options processor 304 is in communicating relationship with the RSVP processor 306 and the packet scheduler 310, as indicated by arrows 318 and 320, respectively. The RSVP processor 306, in turn, is in communicating relationship with the packet classifier 308 and the packet scheduler 310, as indicated by arrows 322 and 324, respectively. In addition, the packet classifier 308 is in communicating relationship with the scheduler 310, as shown by arrow 326, and scheduler 310 is in communicating relationship with the outbound communication interfaces 312*a–c*, as shown by arrow 328.

Messages, including packets or frames, received by layer 3 device 206 are captured by one of the inbound communication interfaces 302*a–c* and passed to one or more components for processing. For example, if the received packets contain one or more options, inbound communication interface 302 hands them to the options processor 304, which may be configured to implement the desired option. If no options are present, inbound communication interface 302 preferably hands the packets to packet classifier 308. Packet classifier 308 is configured to inspect multiple fields of received packets so as to determine whether the packets match any previously established traffic flows, and thus the service, if any, that is to be accorded to the packets. Packet scheduler 310, in addition to directing packets to the appropriate outbound interface 312*a–c* for forwarding, is configured to apply one or more traffic management mechanisms (such as Weighted Fair Queuing) to ensure that the packets are forwarded in time to satisfy the particular service to which they are entitled.

RSVP processor 306 also includes a plurality of subcomponents. In particular, RSVP processor 306 includes at least one path state machine engine 330 that is operatively coupled to a state parameter cache or memory device 332. As described below, path state machine engine 330, in cooperation with state parameter cache 332, maintains the path state established by the source entity 202 and destination entity 204 for a predefined traffic flow so that an accurate latency may be determined relative to the selected path. In addition, RSVP processor 306 directs the packet classifier 308 to look for packets matching the predefined traffic flow, and directs packet scheduler 310 to apply a particular traffic management mechanism to packets that match that flow. The options processor 304 and RSVP processor are facilities implemented by a routing processor at device 206 as indicated by dashed block 334. In contrast, the packet classifier 308 and packet scheduler 310 are facilities implemented by a switching processor as indicated by dashed block 336. Those skilled in the art will understand that routing and switching processors 330, 332 may include additional facilities and/or functions.

In the preferred embodiment, a single communication interface provides both inbound and outbound message receiving and forwarding services. That is, layer 3 device 206 simply includes a set of interfaces through which messages may be received and forwarded. However, to facilitate the present discussion, the communication interfaces have been segregated into inbound and outbound portions, as described above.

It should also be understood that each interface at a layer 3 device is typically assigned a separate IP address, since each interface is often coupled to a different subnetwork of network 200.

Suitable platforms for layer 3 devices 206–220 are the 7500® series of routers or the Catalyst 8500® series of switch routers both from Cisco Systems, Inc. of San Jose, Calif.

Figure 3B:
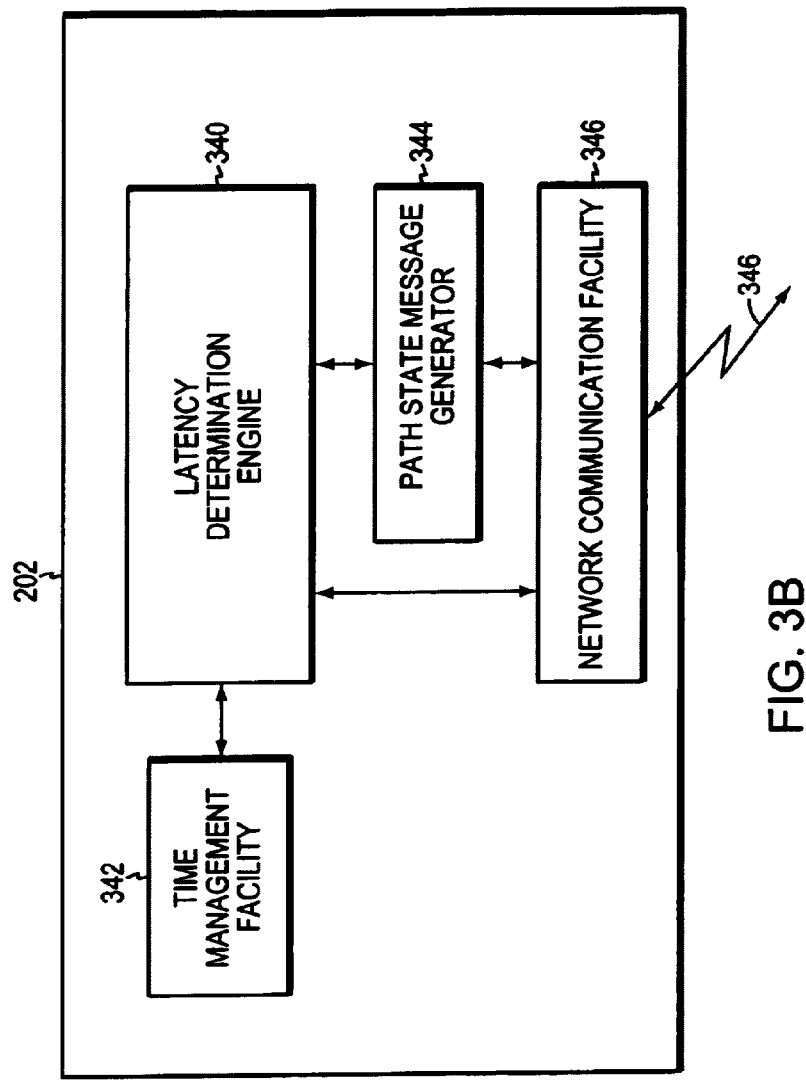

FIG. 3B is a highly schematic, partial functional diagram of a network entity, such as source entity 202. The source entity 202 includes a latency determination engine 340 that is coupled to a time management facility 342 and to a path state message generator 344. The latency determination engine 340 and path state message generator 344 are also in communicating relationship with a network communication facility 346. The network communication facility 346 provides connectivity to the computer network 200 (FIG. 2) as shown by arrow 348. The network communication facility 346 may include conventional hardware and software components to support network communication in accordance with the Transmission Control Protocol/Internet Protocol (TCP/IP) Reference Model.

Suitable platforms for the source and destination entities 202, 204 include any Intel x86/Windows or Unix-based computers or a router.

Routing processor 334, including options processor 304 and RSVP processor 306, and switching processor 336, including packet classifier 308 and packet scheduler 310, at network node 206 (FIG. 3A), as well as latency determination engine 340 and path state message generator 344, at source entity 202 (FIG. 3B), preferably comprise programmed or programmable processing elements containing software programs pertaining to the methods and functions described herein, and which may be executed by the processing elements. Other computer readable media may also be used to store and execute the program instructions.

As indicated above, a service provider or network administrator may wish to accurately determine the latency of a selected path of network 200. In accordance with the present invention, a path reservation state is first established at each layer 3 device included within the selected path. The path reservation state is preferably established through a setup or signaling protocol modified as described below. Once the path reservation state is established, a test message carrying a time stamp is transmitted. By virtue of the pre-established path reservation state, the test message follows the selected path without having to include a source routing option. As a result, the service provider or network administrator obtains a more accurate latency measurement. In other words, the latency measured by the present invention more closely approximates the "true" latency experienced by conventional data packets following the selected path.

In the preferred embodiment, the setup or signaling protocol used to establish the path reservation states is the Resource reSerVation Protocol (RSVP) as set forth in Request for Comments (RFC) 2205 from the Network Working Group of the Internet Engineering Task Force (IETF), which is hereby incorporated by reference in its entirety. RSVP is a well-known signaling protocol that was developed so that entities (typically referred to as receivers) could reserve bandwidth within their computer networks to receive a desired traffic flow from one or more sourcing entities. The traffic flows to which RSVP is typically applied include highly bandwidth-sensitive programs, such as a multimedia broadcasts, videoconferences, audio transmissions, etc. Pursuant to RSVP, sources send RSVP Path messages identifying themselves and indicating the bandwidth needed to receive their programming. If a receiver is interested in the programming offered by a particular source, it sends a RSVP Reservation (Resv) message, which travels hop-by-hop, back to the source. At each hop, the corresponding router establishes a session for the receiver, and sets aside the requested bandwidth for the desired traffic flow. With RSVP, neither the source nor the receiver specifies the particular network path along which the traffic flow is to be routed. Instead, the path is dynamically determined by the layer 3 devices in a conventional manner through application of their routing protocols.

Path Reservation State Setup

Referring to FIG. 2, suppose that the service provider or network administrator wishes to measure the latency from source 202 to destination 204 along the selected network path that includes layer 3 devices 206, 210, 214 and 218. The service provider or network administrator preferably directs the latency determination engine 340 (FIG. 3B) at source entity 202 to establish a path state at each layer 3 device along the selected path (i.e., at devices 206, 210, 214 and 218). In response, the latency determination engine 340 directs path state message generator 344 to formulate and transmit via network communication facility 346 a path state setup message.

Figure 4:
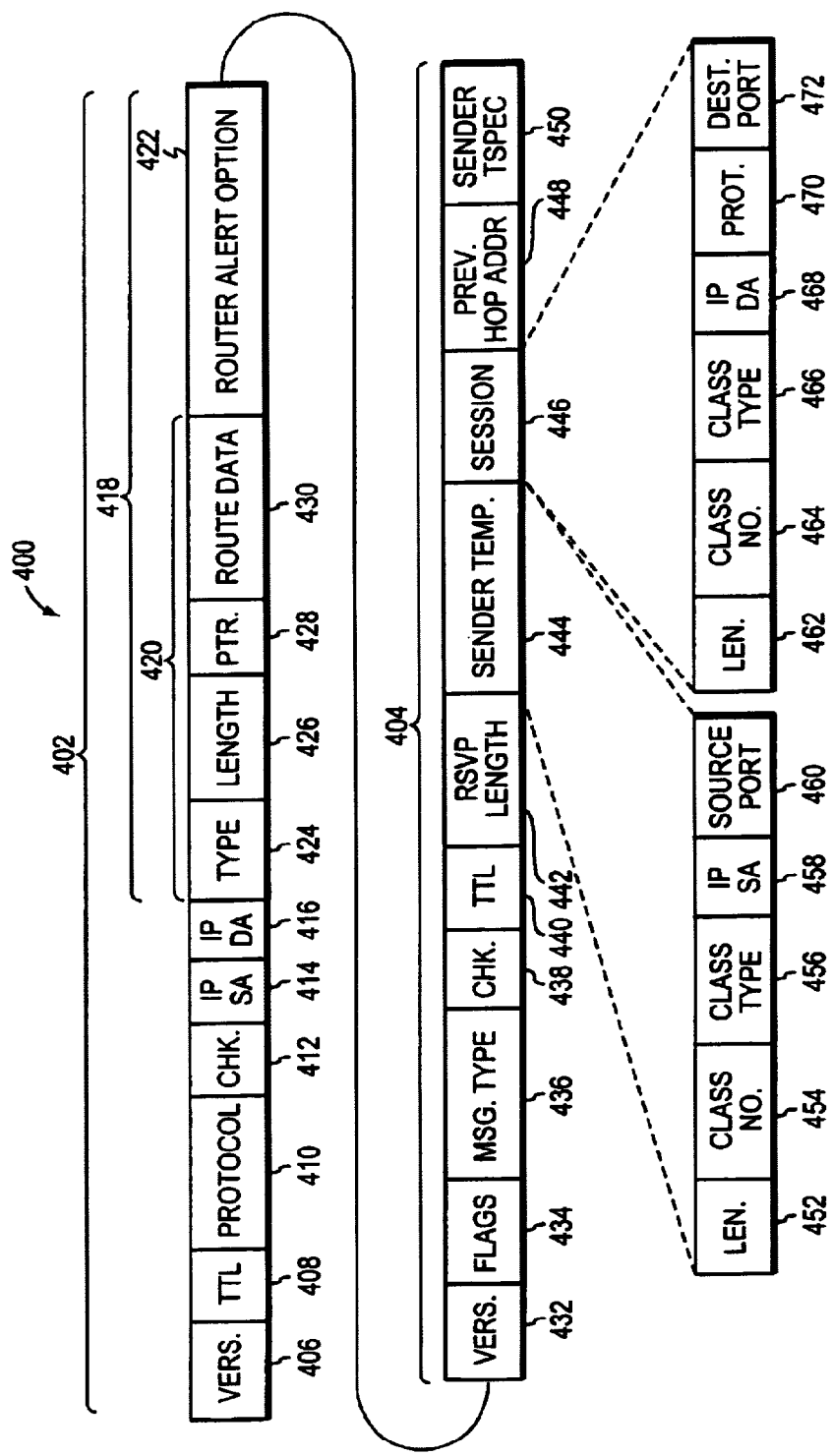
FIG. 4 is a block diagram of a first path state message in accordance with the present invention.

FIG. 4 is a block diagram of a preferred path state setup message 400. The path state setup message 400, which preferably complies with version 4 of the IP protocol, includes an IP header 402 followed by a path message area 404. The IP header 402 includes a plurality of fields, such as a version field 406, a time to live (TTL) field 408, a protocol field 410, a checksum field 412, an IP source address (SA) field 414, and an IP destination address (DA) field 416, among others. Latency determination engine 340 preferably directs path state message generator 344 to load the IP SA field 414 with its own IP address and the IP DA field 416 with the IP address of destination entity 204. Those skilled in the art will understand that IP header 402 also includes additional fields, which are preferably loaded by source entity 202 in a conventional manner.

Unlike conventional RSVP Path messages, latency determination engine 340 directs the message generator 344 to insert at least two options in an options area 418 following the IP DA field 416 of the IP header 402. In particular, message generator 344 preferably inserts both a source routing option 420 and a router alert option 422 into the options area 418. The source routing option 420, which may be in accordance with either strict or loose source routing, includes a type field 424, a length field 426, a pointer field 428 and a route data field 430. Within route data field 430, latency determination engine 340 directs message generator 344 to enter in sequential order the IP addresses for the respective interfaces of each layer 3 device 206, 210, 214 and 218 along the selected path. Latency determination engine 340 may be manually provided with these IP addresses by the service provider or network administrator, or it may discover these IP addresses automatically. For example, latency determination engine 340 generate and send one or more packets to destination entity 204 carrying the well-known record route option of the IP protocol. As described below, by including a source routing option 420 in path state setup message 400, the latency determination engine 340 at source entity 202 constrains the path state setup message 400 to follow the selected path. Consequently, path states are only established at the layer 3 devices along the selected path.

As mentioned above, path state setup message 400 preferably includes the router alert option 422 as specified by the RSVP protocol. The router alert option 422, which is described in RFC 2113, basically directs each layer 3 device, upon receipt of message 400, to examine the message's contents, even though the message is not addressed to the receiving layer 3 device.

Path message area 404 also includes a plurality of fields, which, in the preferred embodiment, are similar to the fields of an RSVP Path message. In particular, path message area 404 includes a version field 432 specifying the version of the RSVP protocol being utilized, a flags field 434 containing flags which are, as of yet, undefined, a message type field 436, which is preferably set to "1" to indicate that message area 404 is to be treated like an RSVP Path message, a checksum field 438, a time to live (TTL) field 440 that is similar to TTL field 408, and an RSVP message length field 442 that specifies the length of path message area 404. Path message area 404 also includes a sender template object 444 and a session object 446. As described in detail below, a previous hop field 448 will be added to the path message area 404 of message 400 by the first layer 3 device along the selected path of network 200 (FIG. 2) (i.e., device 210). As generated by message generator 344, however, message area 402 does not include a previous hop field 448. Although path message area 404 may include a sender traffic specifier (tspec) field 450, in the preferred embodiment it is omitted.

The sender template object 444 is used to specify the source of the path state setup message 400, and the session object 446 is used to specify the destination of the anticipated traffic flow. As described below, layer 3 devices along the selected path utilize the contents of the sender template object 444 and the session 446 to set their respective packet classifiers so as to identify the particular traffic flow to which message 400 pertains. The sender template object 444 and session object 446 each include a plurality of fields. In particular, the sender template object 444 includes a length field 452, a class number field 454, a class type field 456, an IP SA field 458 and a source port field 460. Fields 452–456 are preferably loaded in accordance with the RSVP specification for sender template objects. Latency determination engine 340 preferably directs the message generator 344 to load IP SA field 458 with the IP address for source entity 202 and to de-assert source port field 460 to indicate that engine 340 is not using a transport layer port number.

The session object 446 similarly includes a length field 462, a class number field 464, a class type field 466, an IP DA field 468, a protocol field 470 and a destination port field 472. Again, fields 462–466 are preferably loaded in accordance with the RSVP specification for session objects. IP DA field 468 is loaded with the IP address of destination entity 204 (FIG. 2), protocol field 470 preferably specifies the IP protocol of the anticipated data flow, which typically corresponds to the contents of protocol field 410 of IP header 402. Destination port field 472 contains the transport layer port to which message area 404 should be passed at destination entity 204. The contents of field 472 may also be de-asserted. Furthermore, if path message area 404 includes a sender tspec object 450, its contents (other than the corresponding length, class number, and class type fields) are also preferably de-asserted. By de-asserting the sender tspec object 450, source entity 202 stops layer 3 devices along the selected path from pre-reserving any bandwidth for the identified traffic flow.

To the extent source and destination ports are used by entities 202 and 204, the port numbers are preferably selected in accordance with commonly owned and co-pending U.S. patent application Ser. No. 09/346,080 now issued as U.S. Pat. No. 6,662,223 on Dec. 9, 2003 and entitled A Protocol to Coordinate Network End Points to Measure Network Latency, which is hereby incorporated by reference in its entirety.

After generating path state setup message 400, latency determination engine 340 preferably directs the message generator 344 to transmit it into the network 200 (FIG. 2) via network communication facility 346. Message 400 is first received by the layer 3 device to which source entity 202 is directly coupled (i.e., layer 3 device 206). In particular, message 400 is captured by one of the inbound communication interfaces 302*a*–*c* (FIG. 3), which determines that message 400 carries options area 418, including router alert option 422, and therefore should be further processed by device 206. Accordingly, the inbound interface 302 passes message 400 to the options processor 304, which examines options area 418 and determines that it includes source routing option 420 as well as router alert option 422. In response to the detection of router alert option 422, options processor 304 examines that portion of message 400 following the IP header 402 (i.e., path message area 404). Options processor 304 is preferably configured to recognize path message area 404 as being an RSVP message, and, in response, passes message 400, including source routing option 420, to the RSVP processor 306 for additional processing. Due to the presence of the source routing option 420, options processor 304 also instructs the RSVP processor 306 to return message 400 to it after RSVP processor 306 completes its processing so that the options processor 304 may implement the source routing option 420 of the message 400.

RSVP processor 306 preferably examines the contents of path message area 404, and, based on the contents of message type field 436, recognizes this message 400 as an RSVP path message. In response, RSVP processor 306 directs path state machine engine 330 to initialize, but not yet establish, a corresponding path reservation state. In response, state machine engine 330 stores the IP address of the previous hop router from which it received message 400, as provided in previous hop address field 448, as well as the information from the sender template object 444 and the session object 446. Since layer 3 device 206 is the first hop device, path message area 404 does not include a previous hop address field 448. Accordingly, in this instance, the state machine engine 330 simply stores the IP address of source entity 202 and its source port from fields 458 and 460, and the IP address of destination entity 204, its protocol and destination port from fields 468, 470 and 472 at state parameter cache 332.

RSVP processor 306 then adds a previous hop address field 448 to path message area 404 and enters the IP address corresponding to its outbound communication interface 312 through which message 400 will be sent to reach the next layer 3 device (i.e., device 310) into field 448. RSVP processor 306 preferably determines the address to load into previous hop address field 448 through cooperation with options processor 304, which is evaluating the source routing option 420. Next, RSVP processor 306 returns message 400 to the options processor 304 so that it may complete implementation of the source routing option 420. Specifically, options processor 304 examines the pointer field 428 and the router data field 430 of source routing option 420, and concludes that message 400 should be forwarded to layer 3 device 210. Accordingly, options processor 304 passes the message 400 to packet scheduler 310 with instructions to forward it to layer 3 device 210. Options processor 304 also increments the pointer of field 428 so that it points to the IP address of the next layer 3 device in the route data field 430 (i.e., layer 3 device 214). Those skilled in the art will understand the layer 3 device 206 will also decrement the TTL fields 408 and 440, recalculate the checksums for fields 412 and 438, and perform other conventional layer 3 processing, as required. Packet scheduler 310 forwards the message 400 from the outbound communication interface 312 used to reach layer 3 device 210. It will be understood that, in the absence of source routing option 420, layer 3 device 206 might just as easily forward message 400 to layer 3 device 208.

Message 400 is next received at layer 3 device 210 which performs similar processing to the message. In particular, layer 3 device 210 establishes a pre-reservation state at its state machine engine based on the parameters in the sender template object 444 and session object 446. Since message 400 as received at layer 3 device 210 now includes a previous hop address field 448, device 210 also stores this information in its respective state parameter cache for this pre-reservation state. Based on the contents of the pointer field 428 and the route data field 430 of source routing option 420, the options processor is at device 210 determines that the next device to which message 400 is to be routed is layer 3 device 214. Before forwarding message 400, the RSVP processor of device 210 replaces the contents of the previous hop address field 448 with the IP address associated with its outbound interface through which message 400 will be forwarded in order to reach layer 3 device 214. Device 210 also adjusts the pointer within field 428 to point to the IP address of the next layer 3 device in the route data field 430 (i.e., layer 3 device 218). This process is repeated at the remaining layer 3 devices along the selected path (i.e., devices 214 and 218). In particular, devices 214 and 218 also initialize a path reservation state based on the contents of the sender template object 444, session object 446 and previous hop address field 448.

From layer 3 device 218, message 400 is forwarded to destination entity 204. Destination entity 204 preferably includes a latency determination engine that is also configured to recognize message 400 as a path state setup message from source entity 202, and that source entity 202 is seeking to establish a path state in order to calculate the latency of the selected path. In response, the latency determination engine at destination entity 204 preferably directs its path state message generator to formulate a path state reservation message for forwarding hop-by-hop along the selected path back to source entity 202. The path state reservation message is used to establish (e.g., confirm) the path reservation states previously initialized by the respective state machine engines of devices 206, 210, 214, and 218.

Figure 5:
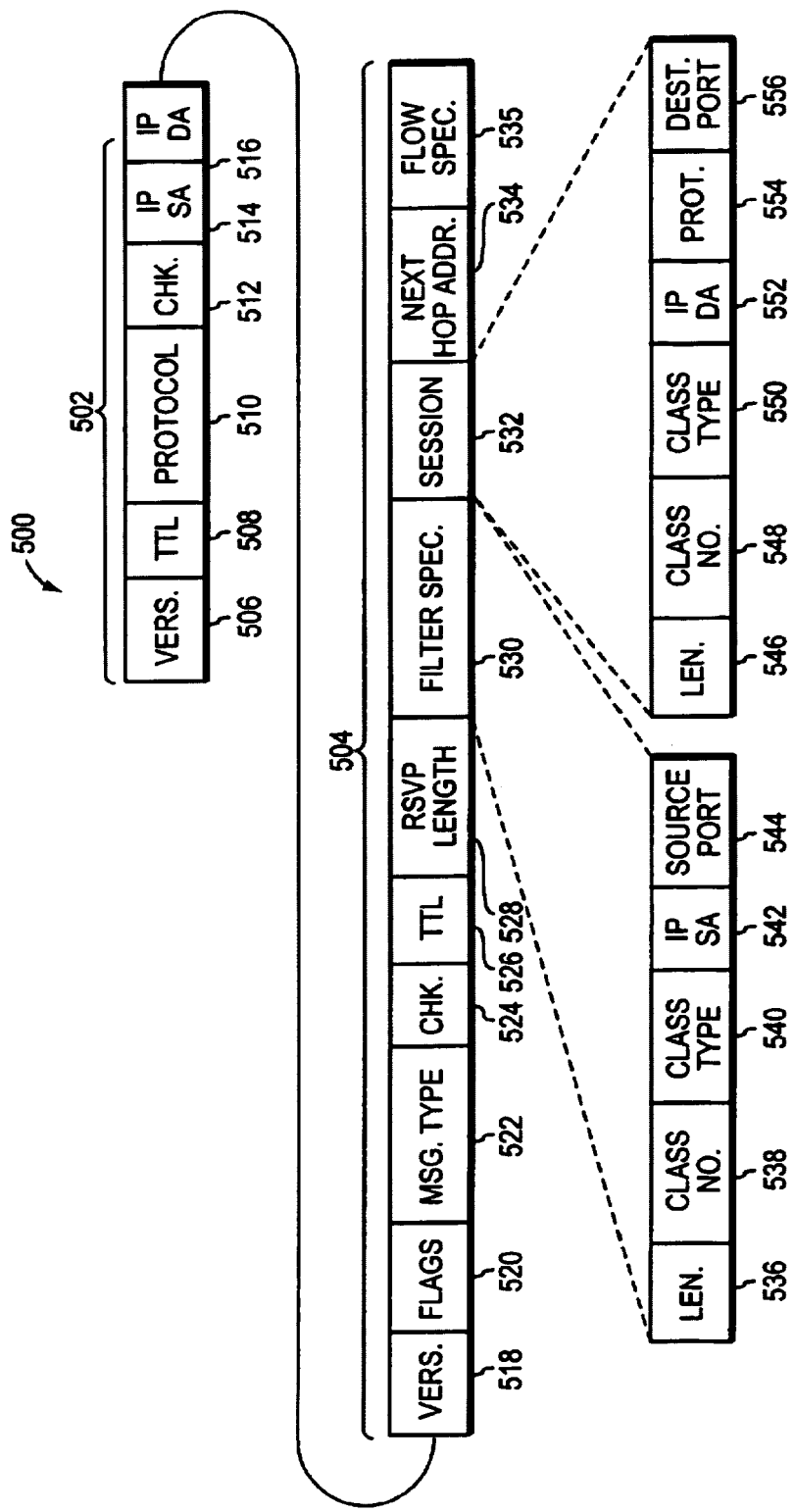
FIG. 5 is a block diagram of a second path state message in accordance with the present invention.

FIG. 5 is a block diagram of a preferred path state reservation message 500 as formulated by destination entity 204. The path state reservation message 500, which preferably complies with version 4 of the IP protocol, includes an IP header 502 followed by a reservation message area 504. The IP header 502 includes a plurality of fields including a version field 506, a time to live (TTL) field 508, a protocol field 510, a checksum field 512, an IP SA field 514 and an IP DA field 516. Destination entity 204 preferably loads fields 506–512 in a conventional manner and enters its own IP address in the IP SA field 514. Since the path state reservation message 500 is to be returned to source entity 202 hop-by-hop, destination entity 204 preferably loads the IP DA field 516 with the IP address of the first hop (i.e., the IP address for layer 3 device 218). Destination entity 204 derives the IP address of the first hop from the contents of the previous hop address field 448 of the path state message 400 that it received. As explained above, before forwarding path state message 400 to destination entity 204, the last hop along the selected path (i.e., layer 3 device 218) placed its own IP address (corresponding to the interface used to reach destination entity 204) in the previous hop address field 448. This IP address is copied by destination entity 204 into the IP DA field 516 of the path state reservation message 500. As shown, the IP header 502 of the path state reservation message 500 preferably does not include any options.

The reservation message area 504 also includes a plurality of fields, which, in the preferred embodiment, are similar to the fields of an RSVP Resv message. In particular, reservation message area 504 includes a version field 518 specifying the version of the RSVP protocol being utilized, a flags field 520, containing flags which are, as of yet, undefined, a message type field 522, which is preferably set to "2" to indicate that message area 504 is to be treated basically as an RSVP Resv message, a checksum field 524, a time to live (TTL) field 526 that is similar to TTL field 508, and an RSVP message length field 528 that specifies the length of reservation message area 504. Reservation message area 504 further includes a filter specification (spec) object 530, a session object 532, and a next hop address field 534. Although message area 504 may include a flow specification (spec) object 535, in the preferred embodiment it is omitted. Destination entity 204 loads the filter spec object 530 with information derived from the sender template object 444 of the path state setup message 400. In particular, destination entity 204 loads a length field 536, a class number field 538 and a class type field 540 as provided in the RSVP specification for filter spec objects. In an IP SA field 542 of the filter spec object 530, destination entity 204 loads the IP address of source entity 202, as provided in IP SA field 458 of the sender template object 444. In a source port field 544, destination entity 204 loads the source port, if any, being utilized by the source entity 202 for this traffic flow, as provided in the source port field 460 of the sender template object 444.

For the session object 532, destination entity 204 loads a length field 548, a class number field 548 and a class type field 550, as provided by the RSVP specification for session objects. In an IP DA field 552, destination entity 204 enters its own IP address. In a protocol field 554, destination entity 204 preferably specifies the network layer protocol of the anticipated data flow, which typically corresponds to the contents of protocol field 510 of IP header 502. A destination port field 556, which can be used to specify the transport layer protocol at destination entity 204, is preferably de-asserted. If a flow spec object 535 is included, its contents (other than the corresponding length, class number, and class type fields) are preferably de-asserted.

Upon formulating the path state reservation message 500, destination entity 204 forwards it to the first hop (i.e., layer 3 device 218) along the selected path, as specified in the IP DA field 516. At layer 3 device 218, the path state reservation message 500 is captured and passed to the respective RSVP processor for processing. The RSVP processor notes that the reservation message 500 corresponds to the earlier forwarded path state message 400. Accordingly, the RSVP processor directs its state machine engine to establish a path reservation state based on the earlier state that was initialized. Specifically, the RSVP processor up-dates the packet classifier at layer 3 device 218 in accordance with the information contained in the filter spec object 530 and the session object 532 of the received path state reservation message 500. More specifically, the RSVP processor at device 218 configures the packet classifier to look for messages, such as IP packets 100 and their corresponding transport layer packets 150 (FIGS. 1A and 1B), in which: (1) the IP SA field 126 has the IP address of source entity 202, as specified in field 542 of the filter spec object 530 of the received path state reservation message 500; (2) the IP DA field 128 has the IP address of destination entity 204, as specified in field 552 of the session object 532; (3) the protocol field 122 contains the transport layer protocol specified in field 554 of the session object 532; (4) the source port field 152 (FIG. 1B) contains the source port specified in source port field 544 of the filter spec object 530; and (5) the destination port field 154 (FIG. 11B) contains the destination port specified in the destination port field 556 of the session object 532.

The RSVP processor at device 218 also directs the respective packet scheduler to create a short-cut for messages matching the above-described criteria. Specifically, the RSVP processor instructs the packet scheduler to switch packets matching this traffic flow onto the outbound interface coupled to destination entity 204. A suitable mechanism for generating short-cuts is described in commonly owned and co-pending U.S. patent application Ser. No. 08/951,820, filed Oct. 14, 1997, now issued as U.S. Pat. No. 6,147,993 on Nov. 14, 2000, and entitled Method and Apparatus for Implementing Forwarding Decision Shortcuts at a Network Switch, which is hereby incorporated by reference in its entirety. As described above, path state reservation message 500 either does not include a flow spec object 535 or, if one is included, its contents are de-asserted. Accordingly, device 218 does not update its packet scheduler to apply a particular traffic management mechanism to packets matching the above mentioned criteria.

It should be understood that the RSVP processor at each layer 3 device along the selected path may need to be configured so as to accept and process path state reservation messages 500, even though they either lack a flow spec object 535 or include a flow spec object whose contents are de-asserted, unlike conventional RSVP Resv messages.

After up-dating the packet classifier and packet scheduler, the RSVP processor at device 218 either builds a new path state reservation message 500 or modifies the one received from destination entity 204 for delivery to the next upstream device (i.e., layer 3 device 214) along the selected path. In the IP DA field 516 of the new path state reservation message 500, device 218 enters the next upstream hop address as stored in its state parameter cache for this particular traffic flow. As described above, when device 218 received the path state setup message 400 as forwarded to it by device 214, the RSVP processor at device 218 stored the corresponding IP address of device 214 through which the message 400 was forwarded at the state parameter cache of device 218. This is the IP address that device 218 now uses in IP SA field 514 of the new path state reservation message 500. In IP DA field 516, the RSVP processor at device 218 enters the IP address associated with the outbound interface through which it will send message 500 to device 214. The RSVP processor copies the contents of the reservation message area 504 into the new path state reservation message 500 addressed to device 214. However, device 218 loads the next hop address field 534 of the new reservation message with the IP address associated with its outbound interface through which message 500 is forwarded. Thus, from the point of view of device 214, the next hop address field 534 will indeed contain the IP address of the next hop for this traffic flow.

Device 218 then sends this new path state reservation message 500 to layer 3 device 214, which represents the next upstream hop along the selected path. Device 214 processes the received path state reservation message 500 in a similar manner as described above in connection with device 218. That is, device 214 similarly directs its packet classifier to look for and identify packets matching the IP SA, IP DA, source port, destination port and protocol as specified in the filter spec object 530 and session object 532 of the received message 500. The RSVP processor at device 214 also directs its packet scheduler to create a short-cut for packets matching this traffic flow. Here, the short-cut forwards such matching packets to the outbound interface coupled to device 218 as provided in next hop address field 534 of the received path state reservations message 500 from device 218. Furthermore, since the received message 500 does not include any flow specifications, the RSVP processor at device 214 does not direct the packet scheduler to apply any particular traffic management mechanisms to matching packets. Device 214 also builds and sends a new path state reservation message 500 to the next upstream hop (i.e., layer 3 device 210).

This procedure is repeated at each of the remaining devices along the selected path. Device 206, moreover, builds and sends a path state reservation message 500 to source entity 202. By receiving a path state reservation message 500 that corresponds to the path state setup message 400 that it sourced, the latency determination engine 340 (FIG. 3B) of source entity 202 "knows" that each of the devices 206, 210, 214, and 218 along the selected path have established a path state, and thus instructed their packet classifiers to detect the specific traffic flow between source entity 202 and destination entity 204, and to forward that traffic along the specified path (i.e., along devices 206, 210, 214, and 218).

In the preferred embodiment, destination entity 204 similarly formulates and sends to source entity 202 a path state setup message 400 having a source routing option 420 that lists the devices along the selected path (i.e., layer 3 devices 206, 210, 214 and 218) in reverse order. Destination entity 204 sends this message 400, which is processed hop-by-hop by each device along the selected path, as described above. The latency determination engine 340 of source entity 202 similarly directs the message generator 344 to formulate and send a path state reservation message 500, which is propagated, hop-by-hop, by each device (i.e., layer 3 devices 206, 210, 214 and 218) along the selected path until it is received at destination entity 204. Through the exchange and processing of path state setup messages 400 and path state reservation messages 500, as described above, path states are established at each device along the selected path and in both directions (i.e., from source 202 to destination 204 and from destination 204 to source 202). Thus, the packet classifiers at the layer 3 devices are now configured to look for a traffic flow from source entity 202 to destination entity 204, and the packet schedulers are configured to forward that traffic along the selected path. The packet classifiers are also configured to look for a traffic flow from destination entity 204 to source entity 202, and the packet schedulers are configured to forward that traffic along the selected path.

Latency Determination

Once the path states have been established within the devices along the selected path, source entity 202 preferably formulates and sends a test message to destination entity 204. In particular, latency determination engine 340 accesses time management facility 342 to create a time record or time stamp. Engine 340 places the time record into a test message and hands it down to the network communication facility 346 for transmission to destination entity 204. In the preferred embodiment, the format of the test message corresponds to the Network Endpoint Control Protocol (NECP), as described in previously referenced and incorporated U.S. patent application Ser. No. 09/346,080 now issued as U.S. Pat. No. 6,662,223 on Dec. 9, 2003, and entitled A Protocol to coordinate Network End Points to Measure Network Latency. The network communication facility 346 preferably encapsulates the test message containing the time record in a corresponding packet. For example, the network communication facility 346 may first create one or more transport layer packets similar to the TCP packet of FIG. 1B, placing the test message from engine 340 into the data field 156. In the source port field 152, latency determination engine 340 directs communication facility 346 to load the value used in the source port field 460 of the sender template object 444 from the path state setup message 400 described above. In the destination port field 154, communication facility 346 is directed to load the value used in the destination port field 472 of the session object 446 from the path state setup message 400. The transport layer packet is then passed down to the respective network layer where it may be encapsulated in a corresponding network layer packet, which, in the preferred embodiment, is preferably similar to IP packet 100 of FIG. 1A. Significantly, the test message utilized with the present invention does not include any options, thus there is no options area 130. In the IP SA field 126 of the test message, network communication facility 346 loads the IP address of source entity 202 (as utilized in the IP SA field 458 of the path state setup message 400), and, in the IP DA field 128, it loads the IP address of destination entity 204 (as utilized in the IP DA field 468 of the path state setup message 400). In the protocol field 122, communication facility 346 places the value, if any, previously utilized in the protocol field 470 from the path state setup message 400.

Communication facility 346 then transmits the test message to destination entity 204. Those skilled in the art will understand that the IP packet containing the time record may be encapsulated in additional messages by other layers of the protocol stack utilized by the network communication facility 346 of source entity 202. The test message is first received at layer 3 device 206, which is coupled to source entity 202. In particular, the message is received at an inbound communication interface 302, and, since, it does not contain any options, it is passed directly to the packet classifier 308. The packet classifier 308 examines the contents of the protocol field 122, the IP SA field 126, the IP DA field 128, and also recovers and examines the contents of the source port field 152 and the destination port field 154 of the corresponding transport layer packet, to determine whether those fields match any established traffic flows. Since the RSVP processor 306 previously configured the packet classifier 308 with this traffic flow, a match is detected. Packet classifier 308 then hands the message to the packet scheduler 310 and informs it of the match. Packet scheduler 310 determines that the appropriate disposition for this message, as previously directed by the RSVP processor 306, is to forward the message to layer 3 device 210. That is, packet scheduler 310 has been configured with a short-cut for forwarding such messages to layer 3 device 210. Packet scheduler 310 thus places the test message in the appropriate outbound communication interface 312 for forwarding to layer 3 device 210. Importantly, by virtue of the path state established at layer 3 device 206 for messages meeting these traffic flow criteria, it does not perform an independent routing decision for this message, which could possibly result in the message being forwarded to layer 3 device 208.

Figure 1A:
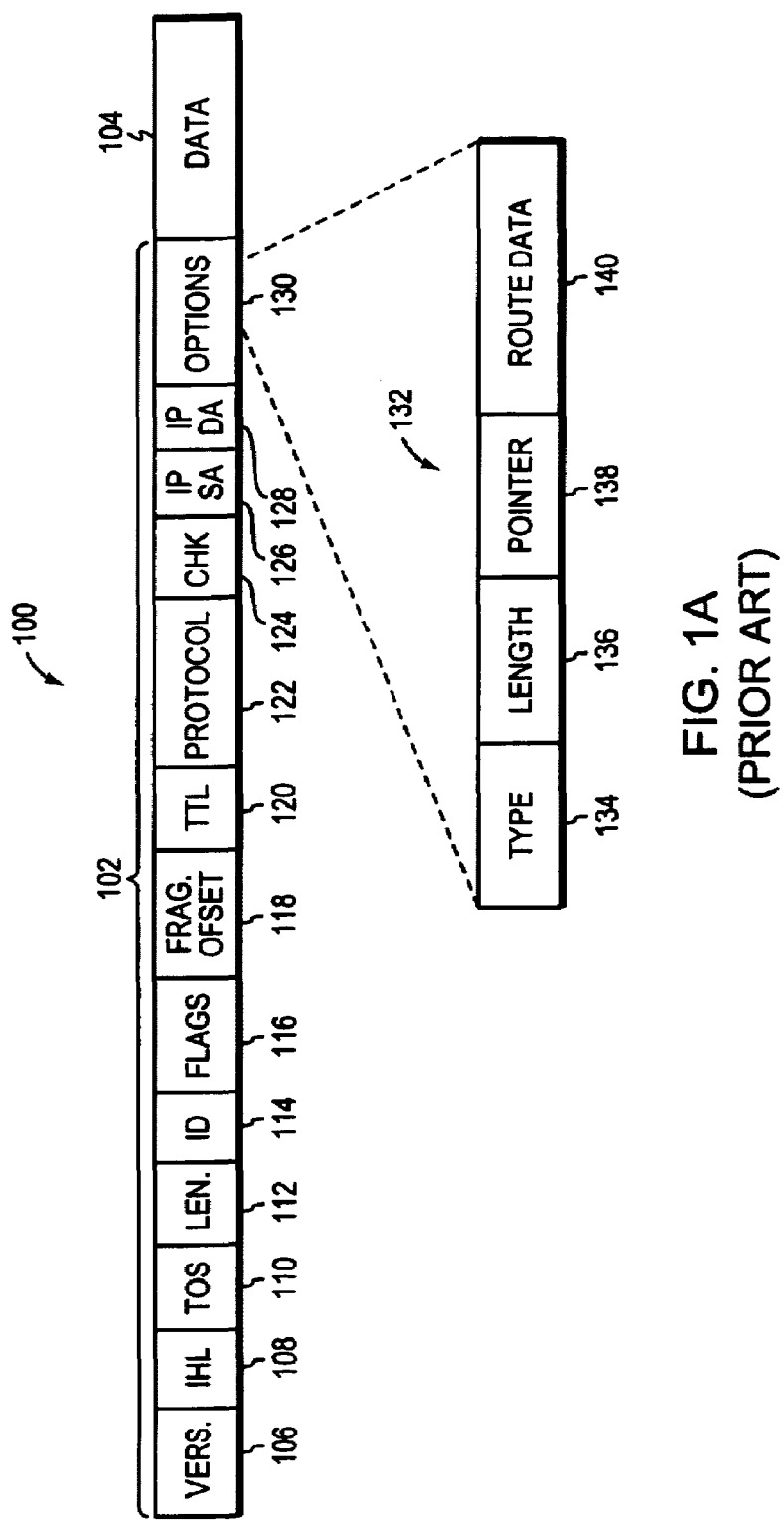
FIGS. 1A and 1B, previously discussed, are block diagrams of a network and transport layer messages.
Figure 1B:
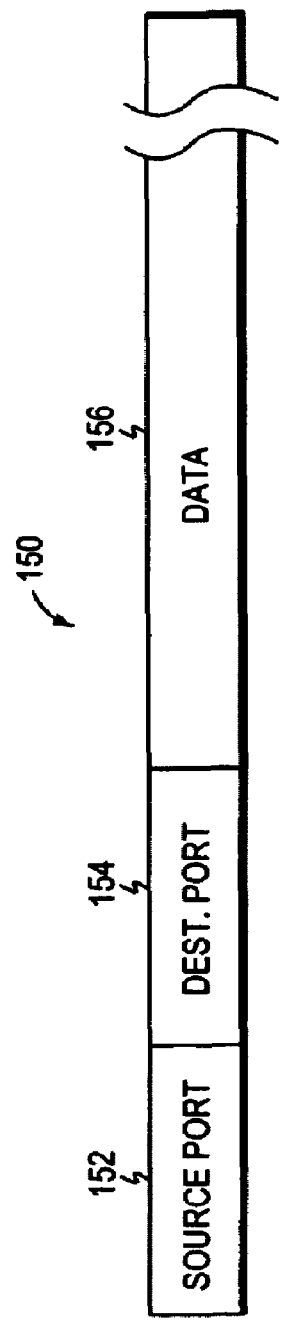

At layer 3 device 210 the same process occurs, resulting in the message being forwarded to layer 3 device 214 by virtue of the path state established at device 210. From device 214, the test message is forwarded to device 218, which, in turn, forwards it to destination entity 204. The latency determination engine of destination entity 204 is preferably configured to return the test message to source entity 202. That is, destination entity 204 generates a second test message containing the time record received from source entity 202. The second test message is similarly handed down to the network communication facility for transmission. Here, the second test message may be encapsulated into a transport layer packet similar to packet 150 (FIG. 1B) with message (containing the time record) loaded into data field 156. The transport layer packet is encapsulated into one or more IP packets, similar to packet 100 (FIG. 1A). In the source and destination port fields 152, 154, destination entity 204 loads the values from fields 460, 472, respectively, of the path state setup message 400, that was used to establish the path states from destination entity 204 to source entity 202. Destination entity 204 similarly loads fields 122, 126 and 128 of the test message with the values from fields 470, 458 and 468, respectively, of the corresponding path setup message 400.

For the same reasons as described above, the test message from destination entity 204 to source entity 202 also follows the selected path. Upon receipt at source entity 202, the message is examined by the latency determination engine 340. In particular, latency determination engine 340 compares the time stamp from the second test message with the current time as provided by time management facility 342. By subtracting the time stamp from the current time, the latency determination engine 340 can calculate a more accurate latency for the selected path. This latency may then be displayed or printed for review by the service provider or network administrator.

In the preferred embodiment, the source and destination entities 202 and 204 release the path states previously established at the layer 3 devices following the latency determination. More specifically, the source and destination entities 202, 204 may formulate and transmit conventional "teardown" messages, in accordance with the RSVP protocol, that explicitly tear down the path states at devices 206, 210, 214 and 218. Alternatively, the source and destination entities 202, 204 may be configured to stop issuing additional path state reservation messages 500 once the test message has been returned to the source entity 202. In accordance with the RSVP protocol, if a layer 3 device stops receiving periodic RSVP Resv messages from a particular receiver, the path state for that receiver is automatically torn down. Thus, by not issuing additional path state reservation messages 500, source and destination entities 202, 204 will cause the corresponding path states to be torn down.

It should be understood that the test message need not be returned to source entity 202 in order for the latency of the selected path to be determined. For example, the source and destination entities 202, 204 may first synchronize their time management facilities or clocks. Thereafter, the destination entity 204 can accurately calculate the latency of the selected path itself, upon receipt of the test message, and thus there is no need to return the time record to source entity 202.

It should be further understood that the present invention may be implemented with other network communications protocols, such as version 6 of the IP protocol, the Connectionless Network Protocol (CLNP), IPX, AppleTalk, DecNet, etc.

It should be further understood that one or more network nodes may themselves be configured to include a latency determination engine and a path state message generator. In this embodiment, the respective network nodes formulate and transmit the path state setup and path state reservation messages.

The foregoing description has been directed to specific embodiments of the invention. It will be apparent, however, that other variations and modifications may be made to the described embodiments, with the attainment of some or all of their advantages. For example, other setup or signaling protocols besides RSVP may be utilized to setup the requisite path states at the devices along the selected path. Therefore, it is the object of the appended claims to cover all such variations and modifications as come within the true spirit and scope of the invention.

What is claimed is:

1. A method for determining latency of a selected path in a computer network having a plurality of network nodes, the computer network further including a first entity disposed at one end of the selected path and a second entity disposed at a second end of the selected path, the method comprising the steps of:

utilizing at least one path state set-up message formulated by the first entity and passed to each network node along the selected path to establish a path state at each network node along the selected path for identifying a traffic flow having predefined parameters;

implementing a source routing option to include in the path state setup message, the source routing option to provide a choice between strict source routing and loose source routing;

forwarding messages matching the predefined parameters of the traffic flow to a next downstream network node along the selected path;

generating a test message at the first entity, the test message addressed to the second entity and configured in accordance with the predefined parameters of the traffic flow;

placing a time record in the test message;

transmitting the test message from the first entity;

in response to receiving the test message at each network node, forwarding the test message from the receiving network node to the next downstream network node along the selected path by virtue of the previously established path states;

in response to receiving the test message at a last downstream network node along the selected path, forwarding the test message to the second entity by virtue of the previously established path states; and using the time record placed in the test message to determine the latency of the selected path.

2. The method of claim 1 wherein the predefined parameters of the traffic flow include at least a network layer address associated with the first entity and a network layer address associated with the second entity.

3. The method of claim 2 wherein the at least one path state setup message formulated at the first entity is addressed to the second entity and includes:

the predefined parameters of the traffic flow; and a source routing option that lists, in sequential order, each network node along the selected path; and the method further comprises the steps of:

in response to receiving the at least one path state setup message at each network node, forwarding the at least one path state setup message from the receiving network node to the next downstream network node along the selected path by virtue of the source routing option; and in response to receiving the at least one path state setup message at the last downstream network node along the selected path, forwarding the at least one path state setup message to the second entity.

4. The method of claim 3 further comprising the steps of:

formulating at least one path state reservation message at the second entity, the at least one path state reservation message addressed to the last downstream network node along the selected path and including the predefined parameters of the traffic flow;

transmitting the at least one path state reservation message from the second entity into the computer network;

in response to receiving the at least one path state reservation message at each network node, including the last downstream network node, (1) establishing a path state corresponding to the predefined parameters of the traffic flow, and (2) sending at least one corresponding path state reservation message from the receiving network node to a next upstream network node;

in response to receiving the at least one path state reservation message at a last upstream network node along the selected path, forwarding the path state setup message to the first entity.

5. The method of claim 4 wherein the step of using the time record placed in the test message comprises the steps of:

generating a second test message at the second entity, the second test message addressed to the first entity and containing the time record from the received test message;

transmitting the second test message from the second entity to the first entity;

constraining the second test message to follow the selected path in the computer network;

upon receiving the second test message at the first entity, comparing the time record with a current time to determine the latency of the selected path.

6. The method of claim 5 wherein the step of constraining comprises the steps of establishing a second path state at each network node along the selected path for identifying a second traffic flow having predefined parameters, and for forwarding messages matching the predefined parameters of the traffic flow to the next upstream network node along the selected path, wherein the second test message generated by the second entity is configured in accordance with the predefined parameters of the second traffic flow.

7. The method of claim 4 wherein the step of using comprises the steps of:

providing a clock management facility at each of the first and second entities;

synchronizing the clock management facilities at the first and second entities;

upon receiving the test message at the second entity, comparing the time record with a current time to determine the latency of the selected path.

8. A computer readable medium containing executable program instructions for generating a path state setup message, the path state setup message for establishing a path state at one or more network nodes along a selected path between first and second entities of a computer network, the executable program instructions comprising steps for:

inserting into the path state setup message a source routing option indicator that lists one or more network nodes along the selected path;

implementing a source routing option in response to the source routing option indicator in the path state setup message, the source routing option to provide a choice between strict source routing and loose source routing; and inserting into the path state setup message one or more parameters that define a selected traffic flow that is to be associated with a test message for determining a latency of the selected path, wherein the path state setup message is generated by the first entity and passed to each of the one or more network nodes along the selected path.

9. The computer readable medium of claim 8 comprising further program instructions for listing each of the network nodes along the selected path in the source routing option.

10. The computer readable medium of claim 9 comprising further program instructions for rendering the path state setup message free from having a sender traffic specifier.

11. The computer readable medium of claim 10 comprising further program instructions for inserting into the path state setup message a router alert option.

12. The computer readable medium of claim 8 comprising further program instructions for tendering the path state setup message free from having a sender traffic specifier.

13. A network node for use in a computer network, the network node disposed along a selected path between first and second entities, the network node comprising:

a plurality of interfaces configured to receive and forward messages;

an options processor in communicating relationship with the plurality of interfaces, the options processor configured to implement one or more options included in a path state setup message received from the first entity and identifying a traffic flow; and a signaling protocol processor in communicating relationship with the options processor, wherein the options processor and signaling protocol processor cooperate to implement a source routing option included in the path state setup message by initializing a path state associated with the traffic flow and forwarding the path state setup message to a next network node as identified in the source routing option the source routing option to provide a choice between strict source-routing and loose source-routing.

14. The network node of claim 13 further wherein the signaling protocol processor, in response to receiving a path state reservation message at the network node, establishes the previously initialized path state.

15. The network node of claim 14 wherein the path state reservation message includes one or more parameters that define a selected traffic flow, the network node further comprising a packet classifier operatively coupled to the signaling protocol processor, whereby the signaling protocol processor configures the packet classifier to identify for messages matching the one or more parameters of the selected traffic flow.

16. The network node of claim 15 further comprising a packet scheduler operatively coupled to the signaling protocol processor, whereby the signaling protocol processor establishes a short-cut at the packet scheduler for application to messages identified by packet classifier as matching the one or more parameters of the selected traffic flow.

17. The network node of claim 16 wherein the signaling protocol processor is a resource reservation protocol processor.

18. An apparatus for generating a path state setup message, the path state setup message for establishing a path state at one or more network nodes along a selected path of a computer network between first and second entities, the apparatus comprising:

means for inserting into the path state setup message a source routing option that lists one or more network nodes along the selected path;

means for implementing a source routing option in response to the source routing option indicator in the path state setup message, the source routing option to provide a choice between strict source routing and loose source routing; and means for inserting into the path state setup message one or more parameters that define a selected traffic flow that is to be associated with a test message for determining a latency of the selected path, wherein the apparatus is disposed at the first entity and the path state setup message is generated by and transmitted from the first entity.

19. An apparatus as defined in claim 18 comprising:

means for listing each of the network nodes along the selected path in the source routing option.

20. An apparatus as defined in claim 18 comprising:

means for rendering the path state setup message free from having a sender traffic specifier.

* * * * *